United States Patent [19]

James

[11] 4,013,141
[45] Mar. 22, 1977

[54] MEANS FOR LUBRICATING A MECHANISM DISPOSED WITHIN A ROTATING SHAFT

[75] Inventor: Freeman D. James, Fairfield, Ohio

[73] Assignee: General Electric Company, Cincinnati, Ohio

[22] Filed: Oct. 16, 1975

[21] Appl. No.: 622,980

[52] U.S. Cl. .......................................... 184/6.11
[51] Int. Cl.[2] ................ F01M 11/00; F01M 11/02; F01M 11/06
[58] Field of Search .......... 308/177, 187; 184/1 R, 184/6, 6.11, 6.17, 7 R

[56] References Cited

UNITED STATES PATENTS

| | | | |
|---|---|---|---|
| 3,085,838 | 4/1963 | Patterson | 308/187 |
| 3,531,935 | 10/1970 | Poucher | 184/6 |
| 3,811,743 | 5/1974 | Wren | 308/187 |

Primary Examiner—Verlin R. Pendegrass
Assistant Examiner—Thomas H. Webb
Attorney, Agent, or Firm—Henry J. Policinski; Derek P. Lawrence

[57] ABSTRACT

Lubrication means are provided for applying lubricant to appropriate devices associated with a hollow rotating shaft. More particularly, a first annular dam is disposed in the flow path of lubricant migrating along the interior surface of a hollow rotating shaft thereby causing lubricant to accumulate upon the interior surface to a sufficient radial thickness to lubricate that portion of the device spaced radially inwardly of the interior surface.

4 Claims, 4 Drawing Figures

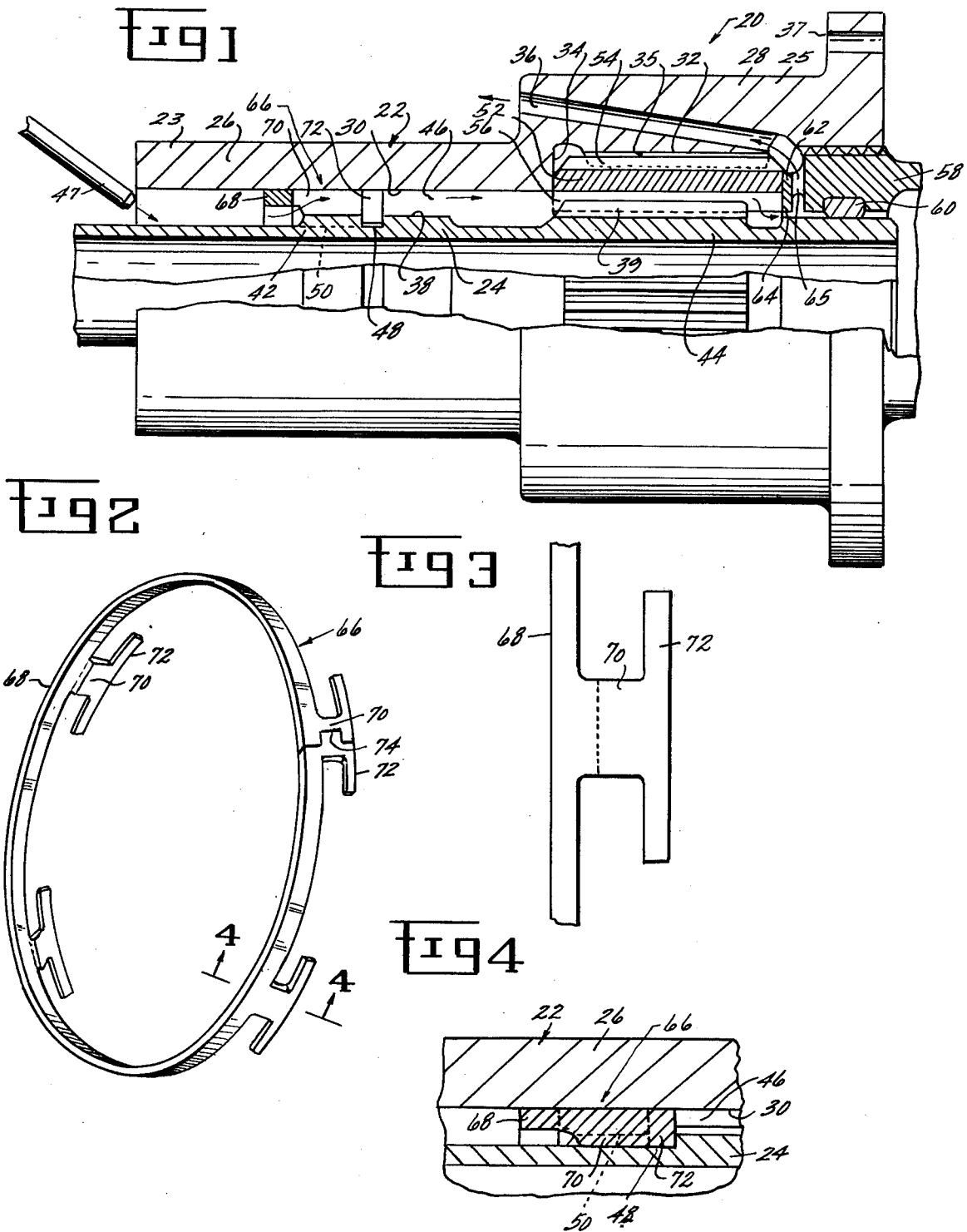

MEANS FOR LUBRICATING A MECHANISM DISPOSED WITHIN A ROTATING SHAFT

BACKGROUND OF THE INVENTION

This invention relates to lubrication means for a machine and, more particularly, to means for providing a film of lubricant of sufficient thickness or depth upon the interior surface of a hollow rotatable shaft. This invention is particularly adaptable for use with power shafts and accessory drive shafts associated with gas turbine engines.

It is well accepted in the art to utilize the interior surface of a hollow rotating shaft to convey lubricant along the length of the shaft to bearings, drive connections or other mechanisms in need of lubrication. The centrifugal forces associated with the rotating shaft force the lubricant to adhere to the inner interior surface of the hollow shaft and, as more and more lubricant is applied to the shaft, the lubricant will spread out and migrate along the interior surface of the shaft. Where the mechanisms needing lubrication are located at the same diameter as the interior surface of the shaft, the lubricant will be conveyed into the mechanism. However, since the lubricant tends to form only a thin film on the interior surface of the shaft, mechanisms spaced radially inward of the interior surface, even by a small radial distance, will not receive the desired lubricant. This invention is directed toward providing lubricant to mechanisms located radially inward of the interior surface of the rotating shaft. The present invention achieves this accomplishment and yet is compatible with assembly and thermal expansion constraints which may be imposed by the structure and operating characteristics of the machine.

Therefore, it is an object of the present invention to provide lubricating means for delivering lubricant to the appropriate mechanisms of a machine. It is a further object of the present invention to provide means for lubricating a mechanism located radially inward of the interior surface of a rotating shaft.

It is yet another object of the present invention to provide lubricating means which are compatible with assembly and thermal expansion techniques associated with the machine.

SUMMARY OF THE INVENTION

These and other objects which will become readily apparent from the following specification and appended drawings are accomplished by the present invention which, in a machine having a first hollow cylindrical rotatable shaft, provides, a flow path for the passage of lubricant through the machine. An interior surface on the shaft provides a first portion of the flow path for migration of lubricant from an upstream end of the shaft to the downstream end of the shaft. Means are provided for introducing lubricant onto the interior surface at the upstream end of the shaft. A device requiring lubrication is disposed downstream of the upstream end of the shaft and at least a portion of the device is spaced radially inwardly of the interior surface by a preselected distance. A first annular dam is disposed downstream of the device in the flow path of the lubricant and impedes the migration of the lubricant in the downstream direction. The first annular dam extends radially inward at least the aforementioned preselected distance whereby lubricant is caused to accumulate to a sufficient radial thickness to lubricate the aforementioned portions of the device spaced radially inward from the interior surface. A second annular dam may be disposed at the upper end to impede the migration of fluid in an upstream direction. The second annular dam may be drivingly connected to a second rotating shaft and movable between a first position in sealing engagement with the interior surface of the first shaft to a second position not in sealing engagement therewith. The drive connection between the second dam and the second shaft is comprised of drive tabs associated with drive grooves.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a partial cross-sectional view of a drive shaft connection assembly including the lubrication means comprising the present invention;

FIG. 2 is a perspective view of a seal element included in the drive shaft connection assembly shown in FIG. 1;

FIG. 3 is a plane view of a portion of the seal element shown in FIG. 2;

FIG. 4 is an enlarged cross-sectional view of the seal element shown in FIG. 3 associated with other elements of the drive shaft connection assembly.

DESCRIPTION OF THE PREFERRED EMBODIMENT

Referring to FIG. 1, the improved lubrication means comprising the present invention is shown. A drive mechanism, shown generally at 20, includes a hollow cylindrical outer shaft 22 and a cylindrical inner shaft 24. Outer shaft 22 is comprised of an upstream end 23 and a downstream end 25 and is drivingly connected to inner shaft 24 through a splined arrangement at downstream end 25 in a manner hereinafter to be described.

Outer shaft 22 is provided with axially consecutively stepped diameter portions 26 and 28 having axially and circumferentially extending interior surfaces 30 and 32 respectively. Radially extending and axially facing end wall 34 lies between and connects surfaces 30 and 32. A plurality of longitudinal interior splines 35 extend radially inwardly from interior surface 32. Annular flange 37 integrally formed on stepped portion 28 is provided for driving connection of outer shaft 22 to a source of motive power (not shown). Shaft 22 further includes a lubricant drain passage 36 (for purposes hereinafter to be described) disposed in downstream end 25 in communication with surface 30 for transmission of lubricant to a sump (not shown).

Disposed concentrically within shaft 22, shaft 24 is also of a hollow cylindrical configuration and includes a cylindrical exterior surface 38 extending axially along the length of shaft 24. Downstream end 44 of shaft 24 includes a plurality of longitudinal splines 39 extending radially outwardly from exterior surface 38. Shaft 24 is so disposed such that an annular gap 46 extending from upstream end 42 to downstream end 44 of shaft 24 separates exterior surface 38 of shaft 24 from interior surface 30 of shaft 22. Nozzle 47 is provided to spray a jet of lubricant into gap 46 at a location disposed adjacent upstream end 42 of shaft 24.

Continuous annular locating groove 48 is formed in surface 38 and extends circumferentially about shaft 24 at its upstream end 42. A plurality of drive grooves 50 (shown by dashed line in FIG. 1), disposed in surface 38 immediately upstream of locating groove 48, are spaced circumferentially apart at predetermined intervals in shaft 24 and intercept locating groove 48 at their downstream ends.

A device requiring lubrication, intermediate splined adapter 52, drivingly links outer shaft 22 and inner shaft 24. More specifically, intermediate splined adapter 52 is generally of an annular axially extending cylindrical configuration with exterior radially outwardly facing splines 54 at its outer circumference and interior radially inwardly facing splines 56 at its inner circumference. Intermediate adapter 52 is positioned within stepped diameter portion 28 of outer shaft 22 such that it abuts endwall 34 and such that the base of interior splines 56 are at the same diameter as surface 30. Exterior splines 54 are mated by press or interference fit with interior splines 35 on interior surface 32 of outer shaft 22. Interior splines 56 matingly but loosely engage exterior splines 39 of the inner shaft 24. As is readily observed in FIG. 1, a portion of interfitting splines 56 and 39 are spaced radially inwardly of interior surface 30 by a preselected distance.

While inner shaft 24 may be splined directly to outer shaft 22 it has been found advantageous to use intermediate splined adapter 52 to link shafts 22 and 24 drivingly together. In many applications shafts 22 and 24 will be fabricated of different materials which although required for strength purposes do not exhibit compatible life properties when in loose mating engagement with each other even though lubricated. By way of example, if outer shaft 22 were fabricated from titanium and inner shaft 24 from steel it is well known that excessive spline wear will result if the shafts are loosely splined together. In many instances a loose spline is required for expedient and efficient assembly of the shafts. Interposition of intermediate splined adapter 52 fabricated of steel between the two shafts particularly addresses this problem. More particularly, intermediate splined adapter 52 is mated tightly, as by press or interference fit, with the titanium outer shaft. Since the interfit is tight no wear between the splines will occur. The steel adapter then can be mated with steel inner shaft 24 in a loose manner without the adverse wear characteristics associated with dissimilar materials.

Intermediate splined adapter 52 is retained in the aforedescribed position by annular retaining member 58 threaded into outer shaft 22. Retaining member 58 includes a sealing element 60 in sealing engagement with surface 38 of shaft 24 which serves to prevent lubricant from leaking out of drive mechanism 20. Retaining member 58 further includes an annular end portion 62 in sufficiently tight abutment with adapter 52 so as to preclude the passage of oil therebetween. Annular end portion 62 is further disposed such that its internal diameter 64 is radially inward of a substantial portion of splines 56 and 39.

Expandable annular seal member 66 resides within gap 46 at the upstream end 42 of inner shaft 24. As best observed in FIGS. 2 and 3, expandable annular seal member 66 is comprised of a circumferentially extending annular sealing ring portion 68, a plurality of axially extending drive tab portions 70 extending from the ring portion 68 and a plurality of partial circumferentially extending locating portions 72 extending from drive portions 70. Both drive tab portion 70 and locating portion 72 are fabricated with sufficient radial thickness such that when expandable seal 66 is inserted over drive shaft 24, drive tab portion 70 are received in drive grooves 50 and locating portions 72 are received in annular locating groove 48. In this manner, expandable seal member 66 is restrained from axial movement relative to shaft 24 by reason of the interfit between locating portions 72 and annular locating groove 48 and further is caused to rotate with shaft 24 by reason of the interfit between drive tab portions 70 and drive grooves 50.

Seal member 66 is divided at split line 74 thereby permitting the seal member to resiliently expand for purposes now to be explained. When the drive mechanism 20 is not in operation seal member 66 hugs inner shaft 24 and hence a small clearance (not shown) exists between seal member 66 and outer shaft 22. The clearance assists assembly of shaft 24 into shaft 22. When drive mechanism 20 is in operation, seal member 66 rotates with drive shaft 24 and, due to centrifugal forces associated with rotation, expands radially outward into sealing engagement with interior surface 30 of drive shaft 22.

The aforedescribed structure defines a flow path for lubricant introduced by nozzle 47 between shafts 22 and 24. The lubricant flow path is comprised of interior surface 30, the base of splines 39, passage 65 in retaining member 58 and lubricant drain passage 36 in outer shaft 22. Annular end portion 62 is interposed in the flow path for purposes hereinafter to be described such that lubricant can only circumvent end portion 62 along its innner diameter 64.

During operation of drive mechanism 20 lubrication of loosely fitting splines 39 and 56 is desirable and is accomplished in the following manner. Nozzle 47 injects lubricant into gap 46 and onto exterior surface 38 of inner shaft 24 at a point proximate of the ring portion 68 of seal member 66. Rotation of shaft 24 slings the lubricant radially outward and onto interior surface 30 of outer shaft 22 at a point downstream of seal member 66. As more and more lubricant is deposited on surface 30, centrifugal force causes the lubricant to spread out along surface 30 in both the upstream and downstream directions. However, due to sealing engagement between seal 66 and surface 30, the lubricant is restricted from migrating upstream past seal 66. Hence, lubricant migrates downstream through the base of splines 39 to annular end portion 62 of retaining member 58. Without the provision of end portion 62, which extends radially inwardly a preselected distance corresponding to the distance a portion of interfitting splines 39 and 56 are radially inwardly spaced from interior surface 30, lubricant would pass through passages 65 and 36 without lubricating those portions of interfitting splines 39 and 56 which are radially inwardly spaced from interior surface 30. However, due to the tight engagement of end portion 62 with adapter 52 and the radially inward extension of end portion 62, the lubricant is initially restricted from entering passages 65 and 36. As the nozzle 47 continues to deposit more and more lubricant onto inner shaft 24 which is then transferred to interior surface 30 of outer shaft 22 as described above, the radial thickness of the lubricant increases thus forming a puddle of lubricant between oil seal 66 and end portion 62. Oil seal 66 and end portion 62 act as upstream and downstream dams respectively which cause an accumulation of oil therebetween of sufficient thickness to effect lubrication of splines 39 and 59 across their full radial height.

After the lubricant has accumulated to a sufficient depth it spills over the internal diameter 64 of end portion 62, whereupon it flows through drain slots 65 and passage 36 back to a sump (not shown). It is readily observed that without the daming effect caused by oil seal 66 and end portion 62, lubricant would simply flow along interior surface 30 of shaft 22 without achieving a sufficient thickness or depth to lubricate the radially inwardly spaced portions of interfitting splines 39 and 56.

While the preferred embodiment of my invention has been fully described, it is understood that modifications of the structure may be made within the spirit of my invention and that it is not to be regarded as being limited to the exact details of the description, but may be utilized without departing from the scope of the invention as defined by the following claims:

I claim:

1. In a machine having a first hollow cylindrical rotatable shaft the combination comprising:
   means for introducing lubricant onto the interior surface of said shaft at the upstream end thereof;
   a device requiring lubrication disposed downstream of the upstream end of said rotatable shaft adjacent said interior surface, at least a portion of said device being spaced radially inward of said interior surface;
   annular dam means disposed downstream of said device, said dam means extending radially inward of the bore of said shaft;
   a second annular dam means disposed at the upstream end of said shaft in a first position in sealing engagement with said interior surface for impeding the migration of lubricant in an upstream direction.

2. The machine as set forth in claim 1 further comprising:
   a second rotatable shaft disposed within said first rotatable shaft and wherein said second annular dam is an expandable seal drivingly connected to said second rotatable shaft for rotation therewith, said second annular dam occupying said first position when said second shaft is in a rotating condition and movable from said first position to a second position not in sealing engagement with said interior surface when said second shaft is not in a rotating condition.

3. The machine as set forth in claim 2 wherein said drive connection between said second annular dam and said second rotatable shaft comprises a tab and mating groove assembly.

4. The machine as set forth in claim 3 wherein said second annular dam is further comprised of an annular sealing ring portion, and a plurality of drive tab portions extending therefrom, each of, said drive tab portions being received by and disposed in drive grooves formed in said second shaft, said drive tab portions and said drive grooves comprising said tab and groove connection.

* * * * *